United States Patent [19]

McLeod et al.

[11] Patent Number: 4,653,199

[45] Date of Patent: Mar. 31, 1987

[54] HOT AIR DRYER WITH MULTIPLE DESICCANT CARTRIDGES

[75] Inventors: John H. McLeod, Clarkston; Leo J. Esper, Romeo, both of Mich.

[73] Assignee: Thoreson-McCosh, Incorporated, Troy, Mich.

[21] Appl. No.: 789,841

[22] Filed: Oct. 21, 1985

[51] Int. Cl.$^4$ ............................................. F26B 21/08
[52] U.S. Cl. ......................................... 34/80; 34/72; 55/34; 55/181; 55/390
[58] Field of Search .................. 34/72, 79, 80; 55/33, 55/34, 181, 390

[56] References Cited

U.S. PATENT DOCUMENTS

| | | | |
|---|---|---|---|
| 870,546 | 11/1907 | Cooke | 55/34 |
| 2,739,669 | 3/1956 | Miller | 55/34 |
| 3,487,608 | 1/1970 | Graff | 55/33 |
| 3,713,272 | 1/1973 | Barrere et al. | 55/33 |
| 3,757,492 | 9/1973 | Graff | 55/181 |

Primary Examiner—Albert J. Makay
Assistant Examiner—David W. Westphal
Attorney, Agent, or Firm—Reising, Ethington, Barnard, Perry & Milton

[57] ABSTRACT

The hot air dryer for plastic materials is disclosed. Three desiccant cartridges are carried on a rotatable turret and each cartridge is indexed successively from a process air station to a regeneration station and thence to a cool down station. At each station, the cartridges are clamped between sets of upper and lower conduit fittings to provide a closed air flow path. A clamp spring acts on a lower conduit carrier to raise the cartridges against the set of upper conduit fittings to a clamped or closed position. The clamping actuator including a motor driven lead screw acts on the carrier to retract it against the resistance of the clamp spring to lower the turret and hence the cartridges away from the set of upper fittings to a stop position and the carrier is further retracted to separate the set of lower conduit fittings from the lower end of the cartridges thereby opening the clamp and the air flow path through the cartridges. A turret drive mechanism rotates the turret to the next index position and the clamp actuator closes the clamp to place the dryer in readiness for another cycle.

9 Claims, 6 Drawing Figures

HOT AIR DRYER WITH MULTIPLE DESICCANT CARTRIDGES

FIELD OF THE INVENTION

This invention relates to drying apparatus; more particularly, it relates to a hot air dryer with multiple desiccant cartridges which are indexed to successive operating stations.

BACKGROUND OF THE INVENTION

Hot air dryers are conventionally used in processing engineering thermoplastic material while it is in pellet form. Most engineering plastics are hygroscopic and tend to adsorb moisture during storage and processing. Nonhygroscopic plastics are susceptible to surface contamination by moisture. In order to enhance the quality of the finished product, the raw plastic should be dried before processing. This is commonly achieved by flowing heated dry air through the plastic material which is held in a drying hopper. In practice, the heated dry air, commonly referred to as "process air", is produced by passing it through a desiccant or molecular sieve for dehumidification and then through a heater before it is delivered to the plastic material. The dry process air is continuously recirculated until the desiccant requires regeneration to remove the adsorbed moisture. As a practical matter, plural desiccant beds in the form of interchangeable cartridges, are used in the drying apparatus. When the desiccant cartridge requires regeneration, it is replaced by a regenerated cartridge and is itself regenerated by flowing heated air therethrough. Following regeneration, it is common practice to cool the desiccant cartridge by flowing cooler air therethrough to reduce the desiccant temperature so that it will more effectively adsorb moisture when it is placed on stream to dehumidify the process air.

In the prior art, drying apparatus is known in which a desiccant bed is automatically moved from the process station to a regeneration station and replaced by a regenerated desiccant bed. This has been accomplished by a continuously rotating desiccant bed with a process air flow path through one sector and a regeneration air flow path through another sector. This arrangement provides for continuous regeneration and avoids the need for complex valves for switching the air flow paths. This is described in advertising bulletin no. 20 dated January 1968 by Thoreson-McCosh, Inc. which describes "Des-i-dri" hopper dryers. A two station indexing hot air dryer is described in the Cooke U.S. Pat. No. 870,546 granted Nov. 12, 1907.

Hot air dryers are also known which utilize three or more cartridges mounted on a turret or carrousel which is indexed automatically to successive stations for process mode, regeneration mode, and cool down mode operation. In this dryer, the cartridges are mounted between two manifolds with rotary valves for gradually changing the flow rate as the carrousel moves the cartridges from one station to the next. This hot air dryer is described in a publication by Con-Air, Inc. as form number 9300CL3-84. An air dryer of this type is also disclosed in the Graff U.S. Pat. No. 3,487,608 granted Jan. 6, 1970.

A general object of this invention is to provide an improved hot air dryer which overcomes certain disadvantages of the prior art.

SUMMARY OF THE INVENTION

In accordance with this invention, a hot air dryer is provided which utilizes a set of desiccant cartridges on an indexing turret to provide successive process, regeneration and cool down modes of operation without the need for complex rotary valve or manifolds. This is provided by relative axial movement of the cartridges and the corresponding dryer conduit fittings whereby they are clamped together in the operating modes and are separated to permit indexing between stations.

Further, according to this invention, a rotatable turret supports a set of desiccant cartridges. Each of the cartridges is provided with an inlet air fitting on one end and an outlet air fitting on the other. A first set of conduit fittings and a second set of conduit fittings corresponding thereto are disposed at opposite ends of the cartridges to form corresponding pairs of conduit fittings. The turret is rotatable to successive index positions in which the cartridge fittings are aligned with corresponding pairs of conduit fittings. The desiccant cartridges and the conduit fittings are movable axially relative to each other between open and closed positions in which the cartridge fittings and conduit fittings are disengaged and engaged. The turret is rotated by driving means from one index position to the next when the cartridges and the conduit fittings are in the open position. The cartridges and conduit fittings are moved axially by actuating means to the open position before the turret is rotated and to the closed position after the turret is stopped in the next index position. A process air flow path, a regeneration air flow path and a cooling air flow path are connected respectively with the corresponding pairs of fittings in the index positions.

A more complete understanding of this invention may be obtained from the detailed description that follows taken with the accompanying drawings.

BEST MODE FOR CARRYING OUT THE INVENTION

Figure 1:
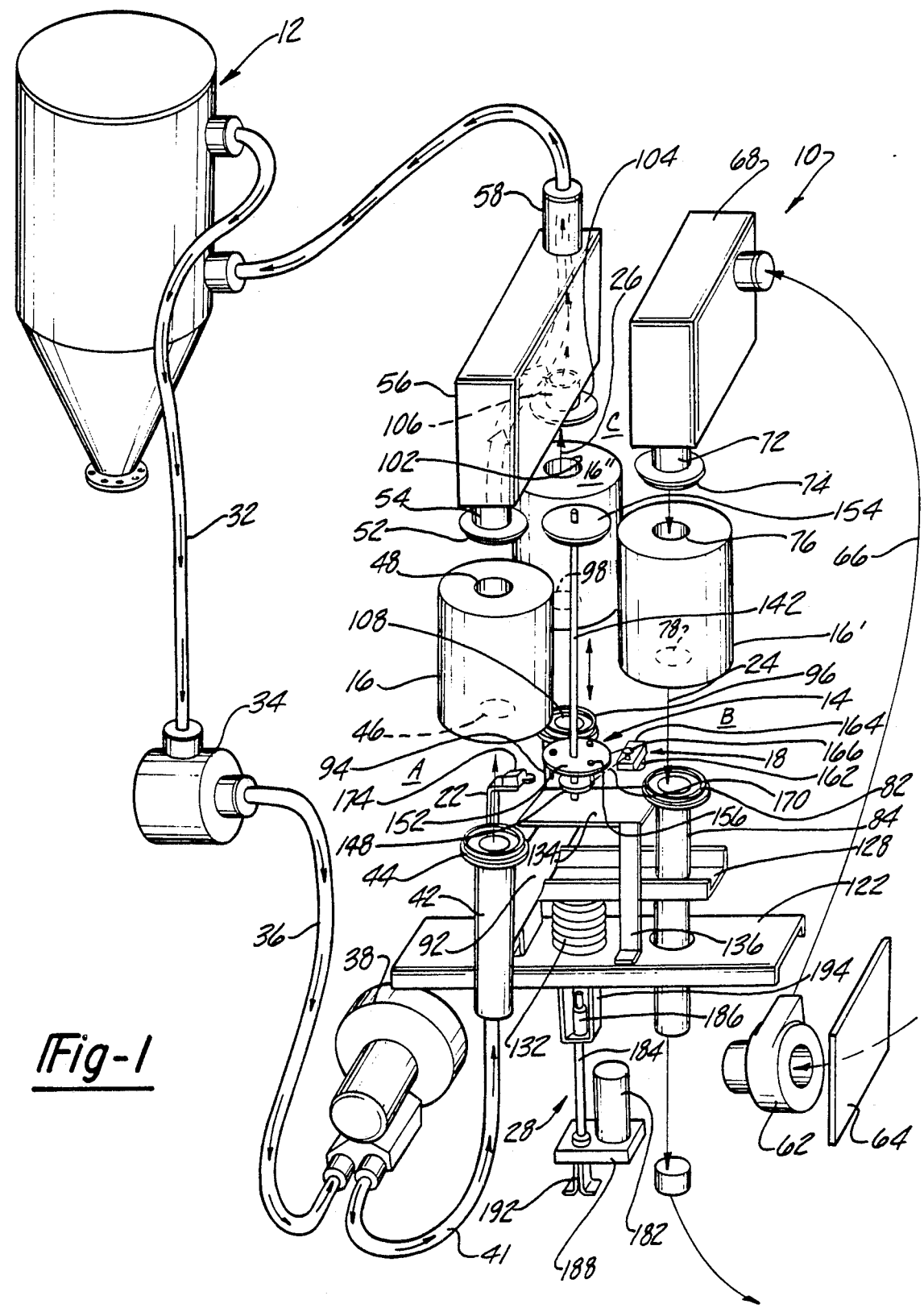
FIG. 1 is a schematic diagram of the hot air dryer of this invention.

Referring now to the drawings, there is shown an illustrative embodiment of this invention in a hot air dryer with an indexing turret carrying three desiccant cartridges and especially adapted for drying plastic materials. It will be understood as the description proceeds, that the invention is useful in other applications and may be practiced in other embodiments.

The hot air dryer 10 of this invention will be described with reference to FIGS. 1 through 6. As shown in FIG. 1, the dryer 10 is connected with a drying hopper 12 in a typical application for dehumidifying plastic pellets. The hopper 12 is suitably mounted on top of an injection molding machine (not shown) or the like. The dryer 10 comprises, in general, a process station A, a regeneration station B and a cooling station C. A carrousel or turret 14 is mounted for rotation about a vertical axis and supports a set of desiccant beds or cartridges 16, 16' and 16" for rotation therewith. A turret drive mechanism 18 rotatably drives the turret 14 about its axis in an intermittent manner so that each of the desiccant cartridges is indexed successively into the process station A, regeneration station B and cooling station C. A process air flow path 22 is provided at station A so that process air passes through the desiccant cartridge 16. A regeneration air flow path 24 is provided at station B so that regeneration air is passed through desiccant cartridge 16'. A cooling air flow path 26 is provided at station C to pass cooling air through cartridge 16". A clamping actuator 28 is adapted to connect the air flow paths 22, 24 and 26 with the cartridges 16, 16' and 16" when the turret 14 is stopped with the cartridges in the respective stations and to disconnect the air flow paths prior to indexing motion of the turrent to the successive position. The dryer 10 will be described in greater detail below.

As depicted in FIG. 1, the process air flow path 22, regeneration air flow path 24 and cooling air flow path 26 are open. In this open condition, the desiccant cartridges 16, 16' and 16" are effectively removed from the air flow paths. In this condition, the turret drive mechanism 18 is operated to advance the turret by one station so that each cartridge is placed in the succeeding station. With the turret thus indexed in alignment with the stations, the clamping actuator 28 is operated to close the air flow paths 22, 24 and 26 and thus connect the desiccant cartridges 16, 16' and 16" in circuit therewith, respectively. Before describing the turret drive mechanism 18 and the clamping actuator 28, the air flow paths of the dryer will be described.

The process air flow path 22 comprises an inlet conduit 32 which extends from an outlet fitting on the drying hopper 12 to the inlet of a filter 34. The filter 34 is adapted to remove particles, such as fines from the plastic pellets in the hopper 12, from the air flow. The outlet of the filter 34 is connected through a conduit 36 to the inlet of a blower 38. The outlet of the blower is connected through a flexible conduit 41 to a rigid conduit 42 which terminates in a lower conduit fitting 44. The lower conduit fitting is adapted to sealingly engage a cartridge fitting 46 at the inlet of cartridge 16. The conduit fitting 44 and cartridge fitting 46 are shown in detail in FIG. 5. The conduit fitting 44 comprises an annular flange 43 with an annular gasket or seal 45 mounted thereon. The cartridge fitting 46 is a flat annular surface on the end plate of the cartridge 16 surrounding the air flow passage therein. The other conduit and cartridge fittings are of the same construction. An upper conduit fitting 52 is adapted to sealingly engage a cartridge fitting 48 at the outlet of the cartridge 16. The conduit fitting 52 is connected through a conduit 54 with the inlet of a process air heater 56. The outlet of the heater 56 is connected through an outlet conduit 58 which is connected with the inlet of the drying hopper 12.

The regeneration air flow path 24 comprises a blower 62 which has an inlet open to the ambient air through a filter 64. The outlet of blower 62 extends through a conduit 66 to the inlet of a regeneration air heater 68. The outlet of the heater 68 extends through a conduit 72 to an upper conduit fitting 74. The fitting 74 is adapted to sealingly engage a cartridge fitting 76 at the inlet of cartridge 16'. The cartridge 16' has an outlet fitting 78. A lower conduit fitting 82 is adapted to sealingly engage the cartridge fitting 78. A rigid conduit 84 extends from the conduit fitting 82 to a flexible conduit 85 which discharges the regeneration air to the atmosphere.

The cooliing air flow path conveys a portion of the process air from the outlet of blower 38 through the cartridge 16" at station C. For this purpose, it comprises a horizontal rigid conduit 92 which branches from the conduit 42 and through a vertical rigid conduit 94 which terminates in a lower conduit fitting 96. The fitting 96 is adapted to sealingly engage the cartridge fitting 98 at the inlet end of the cartridge 16" instation C. An upper conduit fitting 104 on a conduit 106 is adapted to sealingly engage the cartridge fitting 102 at the outlet end of cartridge 16". The conduit 94 is provided with an orifice plate 108 to restrict the air flow through the cooling air flow path. Conduit 106 extends to a second inlet of the process air heater 56. From the outlet of the heater 56 the cooling air flow path coincides with the process air flow path through the hopper 12, filter 34 and back to the blower 38.

Figure 2:
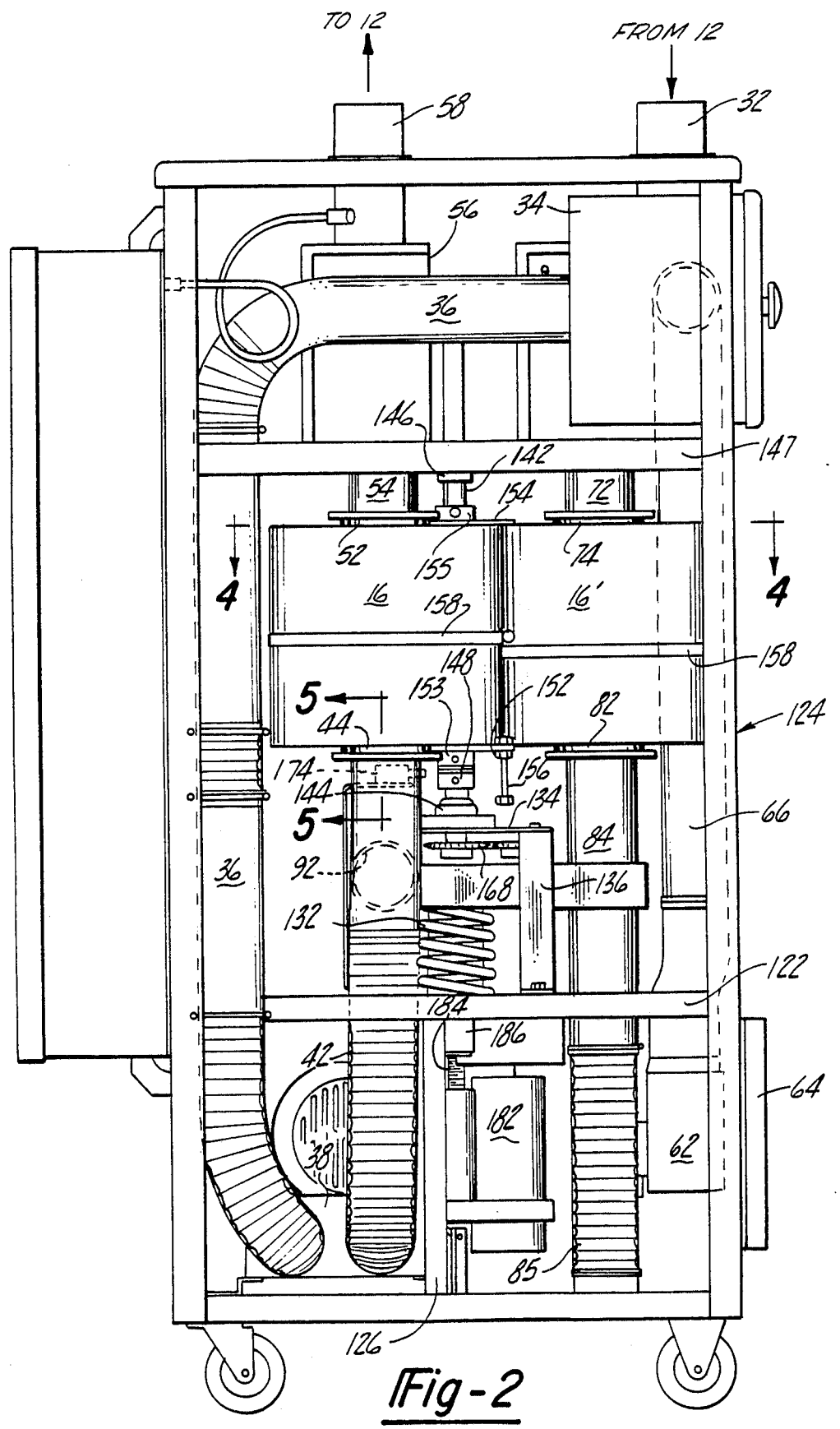
FIG. 2 is a front elevation view of the dryer with the front cover panel removed.
Figure 3:
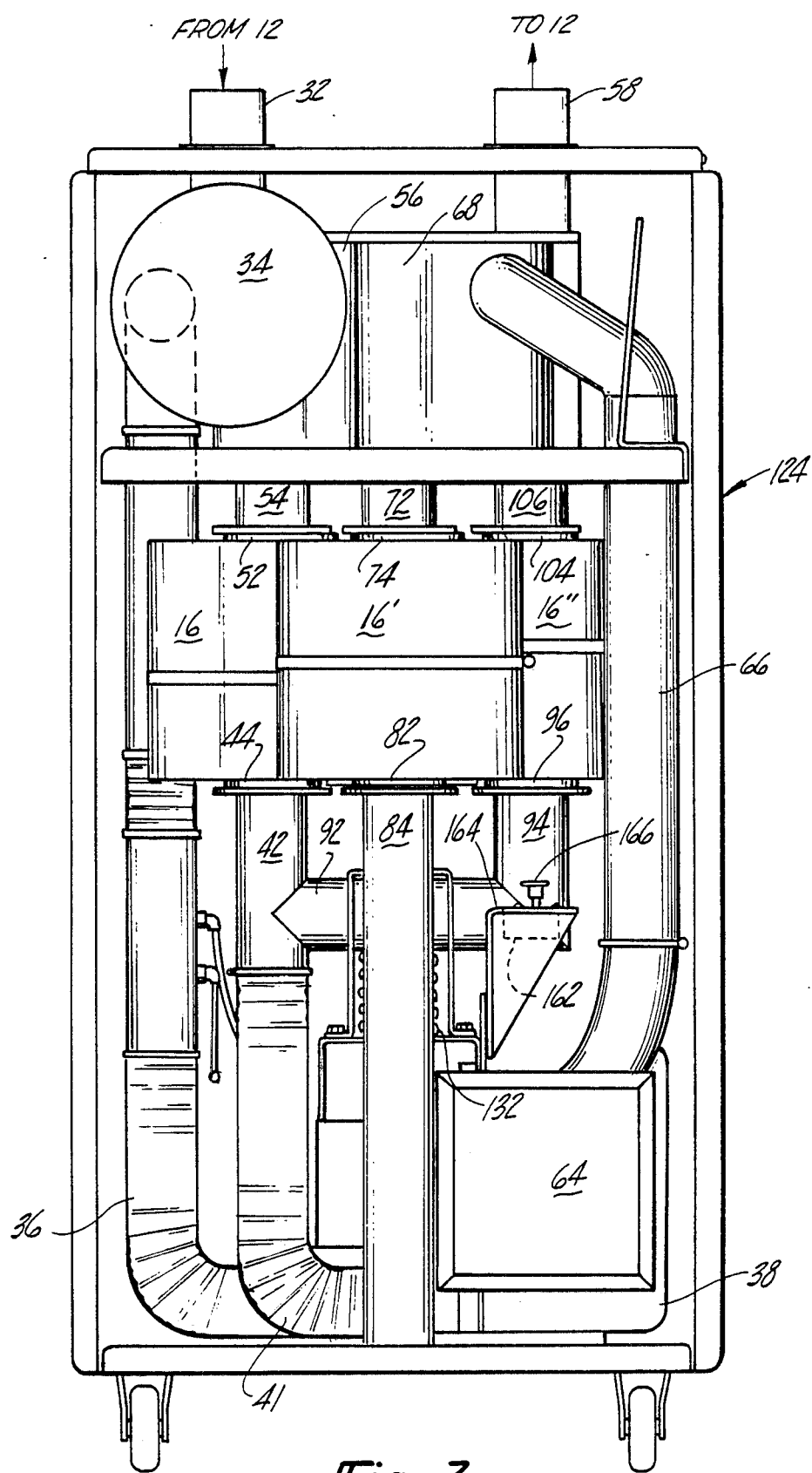
FIG. 3 is a side elevation view of the dryer with the side cover panel removed.
Figure 4:
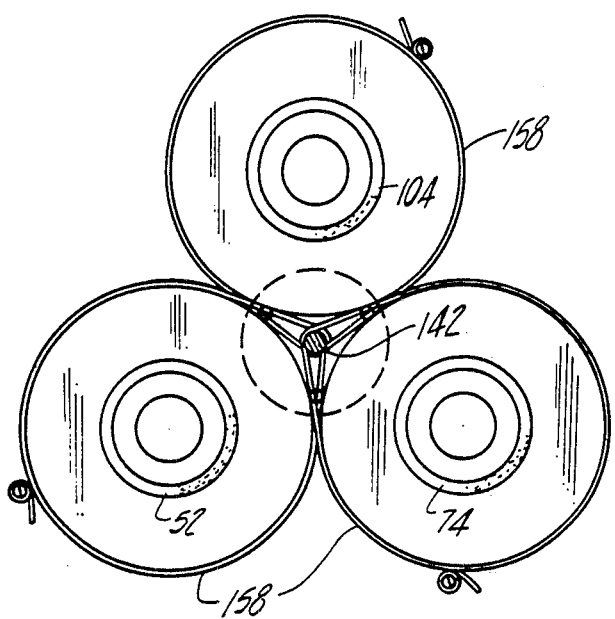
FIG. 4 is a view taken on lines 4—4 of FIG. 2.
Figure 5:
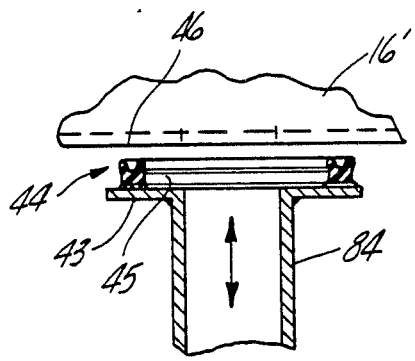
FIG. 5 is a view taken on lines 5—5 of FIG. 2.

The mechanical structure of the hot air dryer 10 will now be described in greater detail, particularly with reference to FIGS. 1, 2 and 3. A stationary platform 122 is supported on the frame of the cabinet 124 and by legs 126 which extend to the cabinet floor. A conduit carrier 128 in the form of a channel is secured, as by welding, to the rigid conduit 84 and the horizontal conduit 92. The carrier 128 is supported on the stationary plateform 122 by a compression or clamp spring 132. A support plate 134 is mounted on the platform 122 by legs 136. The turret 14 is mounted on the support plate 134 in a manner which will be described presently.

The turret 14 comprises a turret shaft 142 having a vertical axis of rotation and supported for rotation in a lower bearing 144 on support plate 134. The upper end of the turret shaft 142 is supported for rotation in an upper bearing 146 which is mounted on a stationary platform 147. A collar 148 is secured to the lower end of the shaft 142 above the bearing 144. The turret shaft 142 is axially movable in the bearings 144 and 146. The downward movement of the shaft 142 is limited by the collar 148 which engages the bearing 144 when the shaft is in its lower position.

For the purpose of carrying the cartridges 16, 16' and 16" on the turret 14, a lower turret plate 152 is mounted on the shaft by a collar 153. The cartridges 16, 16' and 16" rest on the lower turret plate 152 and an upper turret plate 154 secured to the turret shaft 142 by a collar 155 is seated against the upper ends of the cartridges. A set of index pins 156 are equally spaced circumferentially and extend vertically through the lower turret plate 152. Each index pin comprises a bolt and nut and the three nuts on the upper surface of the turret plate serve as spacers or locating lugs for positioning the three cartridges. The cartridges are individually secured to the turret 14 by individual clamp bands 158. Each of the index pins 156 referred to above has a shank extending beneath the turret plate 152 and is adapted to engage the actuator of a microswitch 174 for turret indexing purposes, as will be described subsequently.

The turret drive motor 162 is mounted by a bracket 164 on the platform 122. A driving sprocket 166 is mounted on the shaft of the motor 162 and is coupled through a drive chain 172 to a driven sprocket 168 on the turret shaft 142. Thus, when the motor is energized the turret 14 is rotated; the motor 162 is controlled for intermittent rotation in a manner to be described subsequently.

As described above, the conduit carrier 128 is supported on the clamp spring 132. This spring exerts sufficient force to support the conduit carrier and the turret 14 and to sealingly clamp the conduit and cartridge fittings together so that the air flow paths are in the closed position, as shown in FIGS. 2 and 3. In the closed position of the air flow paths, the lower conduit fittings 44, 82 and 96 are in sealing engagement with the lower cartridge fittings 46, 78 and 98, respectively, and the upper cartridge fittings 48, 76 and 102 are sealingly engaged with the upper conduit fittings 52, 74 and 104, respectively. With the air flow paths in the closed position, the dryer is operative to supply process air to the hopper 12 at station A and, at the same time, regenerate the cartridge at station B and cool down the cartridge at station C. As described above, the air flow paths must be opened in order to permit indexing of the turret between stations. In the open position, the upper conduit fittings 54, 74 and 104 are vertically spaced from the upper cartridge fittings 48,76 and 102 and also the lower conduit fittings 44, 82 and 96 are vertically spaced from the lower cartridge fittings 46, 78 and 98, respectively. In this open condition of the air flow path the blowers 38 and 62 continue to operate and the air flow is discharged to the atmosphere at the conduit fittings during the time interval required to index the turret from one station to the next.

In order to open the air flow path to permit the indexing of the turret, the clamping actuator 28 is provided. The actuator 28 comprises an electric motor 182, a lead screw 184 and a travelling nut 186. The motor 182 is mounted on a gear box 188 which in turn is secured by a bracket 192 to the floor of the cabinet 124. The travelling nut 186 is mounted on a U-shaped link 194 which, at its upper end, is secured to the conduit carrier 128. The motor 182 is drivingly connected with the lead screw 184 through a gear train (not shown). When the lead screw 184 is driven in one direction, the travelling nut 186 is retracted onto the lead screw and the conduit carrier 128 is pulled downwardly or retracted against the compression force of the spring 132. This downward movement of the carrier 128 lowers the conduit fittings 44, 82 and 96 and the cartridges 16, 16' and 16" and the turret 14 are lowered therewith. This causes the cartridge fittings 48, 76 and 102 to separate from the upper conduit fittings 52, 74 and 104, respectively. Downward movement of the turret 14, and hence the cartridges, is arrested by the engagement of the collar 148 on the turret shaft 142 with the bearing 144. Continued rotation of the motor 182 further retracts the carrier 128 against the spring 132 and the lower conduit fittings 44, 82 and 96 are separated from the lower cartridge fittings 46, 78 and 98, respectively. When this open position is reached, the motor 182 is turned off by a limit switch, as will be described subsequently. After the turret is indexed, with the air flow in the open position, to the next station, the flow paths are closed by rotation of the motor 182 in the opposite direction. This gradually releases the compression of clamping spring 132 which raises the carrier 128 causing reversal of the sequence described above and restoring the air flow paths to the closed position.

The control circuit for the opening and closing cycle of the air flow paths will be described with reference to FIG. 6. The control circuit for the actuator motor 182 and the drive motor 162 is connected between lines L1 and L2 of a supply voltage source. The limit switch 174 which is actuated by the indexing pins 156 on the turret 14 has its movable contact connected with the line L1. A timer 212 is connected between the upper fixed contact of the limit switch 174 and line L2. Timer 212 actuates normally open switch contacts 214 which are connected in series with a control relay 216 between the upper fixed contact of limit switch 174 and line L2. Control relay 216 actuates normally closed switch contacts 218 and normally open switch contacts 222. For controlling the energization of the motors 182 and 162 switch contacts 218 are connected in series with the upper limit switch 224 and the clamp actuating motor 182 between the upper fixed contact of limit switch 174 and line L2. The switch contacts 222 are connected between line L1 and the lower fixed contact of limit switch 174. A lower limit switch 226 is connected in series with the turret drive motor 162 between the lower fixed contact of limit switch 174 and line L2.

Figure 6:
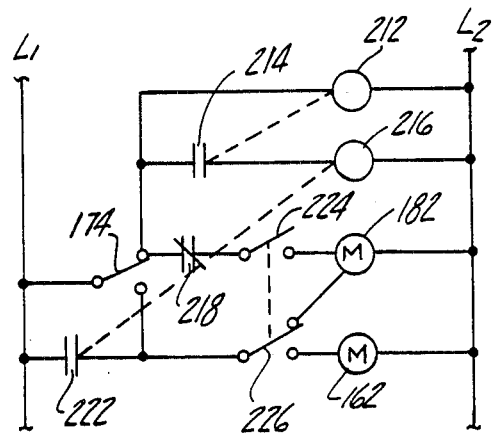
FIG. 6 is a schematic diagram of the electrical control circuit.

In operation, repeated cycles of the drying apparatus are executed under the control of the control circuit shown in FIG. 6. It will be assumed that the cycle starts with the cartridge 16 in the process station A with the clamping actuator closed ("clamp" closed) so that process air is supplied to the hopper 12, and the cartridge 16' is being regenerated and the cartridge 16" is being cooled down. In this condition, the limit switch 174 is closed against the upper fixed contact as shown in FIG. 6. This energizes the timer 212 and, during the time-out interval which may be in the order of seventy minutes, the motors 162 and 182 are deenergized. When the timer 212 times out, it actuates the switch contacts 214 to the closed position which energizes the control relay 216. This control relay actuates the switch contacts 222 to the closed position and the contacts 218 to the open position. With contacts 222 closed, the clamp motor 182 is energized through the lower limti switch 226 which is closed when the clamp is closed. Thus, the clamp motor 182 is driven in the direction to open the clamp i.e. lower the carrier 128. When the open position is reached, the lower limit switch 226 is open and the upper limit switch 224 is closed. When lower limit switch 226 is closed, the turret drive motor 162 is energized, contacts 222 having been previously closed by control relay 216. The turret is rotated until the limit switch 174 is actuated by the succeeding index pin 156 which momentarily closes the movable contact of the limit switch 174 against the lower fixed contact. This resets the timer 212 and energizes the control relay 216 which opens contacts 222 and closes contacts 218. With contacts 222 open, turret motor 162 is deenergized and the turret stops in the next index position. With contacts 218 closed and upper limit switch 224 closed, the clamp motor 182 is energized in the reverse direction and the carrier 128 is raised to close the clamp. When the closed condition is reached, the upper limit switch 224 is opened and the lower limit switch 226 is closed thus placing the control circuit in readiness for execution of the next cycle.

Although the description of this invention has been given with reference to a particularly embodiment, it is not to be construed in a limiting sense. Many variations and modifications will now occur to those skilled in the art. For a definition of the invention reference is made to the appended claims.

What is claimed is:

1. A hot air dryer comprising:
a rotatable turret, a set of desiccant cartridges supported on said turret, each of said cartridges including inlet and outlet cartridge fittings at opposite ends, a first set of conduit fittings equally spaced from each other and disposed at one end of said cartridges, a second set of conduit fittings equally spaced from each other and disposed at the other end of said cartridges, each conduit fitting in said first set corresponding with one of said conduit fittings in said second set to form a corresponding pair of conduit fittings, said turret being rotatable about a turret axis to successive index positions in which each of said cartridge fittings at one end of said cartridges is aligned with one of said conduit fittings in said first set to form a pair of mating fittings and each of said cartridge fittings at the other end of said cartridges is aligned with one of said conduit fittings in said second set to form a pair of mating fittings, said set of cartridges, said first set of conduit fittings and said second set of conduit fittings being movable axially relative to each other between open and closed positions in which the fittings of each of said pairs of mating fittings are disengaged and engaged with each other, respectively, driving means for rotating said turret from one index position to the next when said fittings are in said open position, a process air flow path connected between a first corresponding pair of conduit fittings, a regeneration air flow path connected between a second pair of corresponding conduit fittings, a cooling air flow path connected between a third pair of corresponding conduit fittings, and actuating means for moving said cartridges and said conduit fittings to said open position before said turret is rotated and for moving said cartridges and conduits to said closed position after said turret is stopped in said next index position.

2. The invention as defined in claim 1 wherein one of said sets of conduit fittings is stationary and said actuating means comprises:

first force applying means for moving the other of said sets of conduit fittings into engagement with one of said sets of cartridge fittings and for moving said cartridges so that the other of said sets of cartridge fittings are in engagement with the said one of said sets of conduit fittings, and second force applying means for moving said cartridges so that the other of said sets of cartridge fittings is disengaged from said one of said sets of conduit fittings and the other of said sets of conduit fittings and other of said sets of conduit fittings is disengaged from said one of said sets of cartridge fittings.

3. The invention as defined in claim 2 wherein said first force applying means is a spring and the second force applying means is a lead screw and a motor.

4. The invention as defined in claim 3 wherein:
said turret axis is vertical, said first and second sets of conduit fittings are disposed at the lower and upper ends of said cartridges, respectively.

5. The invention as defined in claim 1 wherein the number in each of said sets is three.

6. The invention as defined in claim 1 wherein each of said conduit fittings comprises an annular seal adapted to sealingly engage one of said cartridge fittings.

7. The invention as defined in claim 1 wherein said process air flow path extends between said first corresponding pair of conduit fittings and includes a process air heater and a process air blower and wherein said cooling air flow path extends between said third corresponding pair of conduit fittings and includes said process air heater and said process air blower.

8. The invention as defined in claim 7 wherein said regeneration air flow path extends between said second corresponding pair of conduit fittings and includes a regeneration air heater and a regeneration air blower.

9. The invention as defined in claim 7 wherein said cooling air flow path includes a flow restrictor.

* * * * *